United States Patent
Derecskei et al.

(10) Patent No.: US 9,731,979 B2
(45) Date of Patent: Aug. 15, 2017

(54) PURIFICATION OF TITANIUM TETRACHLORIDE

(71) Applicant: Cristal USA Inc., Hunt Valley, MD (US)

(72) Inventors: Bela Derecskei, Glen Burnie, MD (US); Alexandre Jean Fines, Ellicott City, MD (US); Alastair Valentine, Glen Burnie, MD (US)

(73) Assignee: Cristal USA Inc., Hunt Valley, MD (US)

( * ) Notice: Subject to any disclaimer, the term of this patent is extended or adjusted under 35 U.S.C. 154(b) by 193 days.

(21) Appl. No.: 14/395,742

(22) PCT Filed: Apr. 15, 2013

(86) PCT No.: PCT/US2013/036544
§ 371 (c)(1),
(2) Date: Oct. 20, 2014

(87) PCT Pub. No.: WO2013/158525
PCT Pub. Date: Oct. 24, 2013

(65) Prior Publication Data
US 2015/0064100 A1    Mar. 5, 2015

Related U.S. Application Data

(60) Provisional application No. 61/636,156, filed on Apr. 20, 2012.

(51) Int. Cl.
*C01G 23/02*    (2006.01)

(52) U.S. Cl.
CPC ........ *C01G 23/024* (2013.01); *C01P 2006/80* (2013.01)

(58) Field of Classification Search
CPC .................................... C01G 23/024
USPC ........................................ 423/492
See application file for complete search history.

(56) References Cited

U.S. PATENT DOCUMENTS

| | | | |
|---|---|---|---|
| 2,207,597 A * | 7/1940 | Pechukas | C01G 23/024 106/437 |
| 2,834,667 A | 5/1958 | Rostron | |
| 3,421,917 A | 1/1969 | Pavlica | |
| 3,760,071 A | 9/1973 | Brzozowski et al. | |
| 3,939,244 A | 2/1976 | Piccolo et al. | |
| 4,994,191 A | 2/1991 | Kuznicki et al. | |

(Continued)

FOREIGN PATENT DOCUMENTS

JP    2009012993 A *    1/2009

OTHER PUBLICATIONS

Efremov et al, "Adsorption Purification of Titanium Tetrachloride", Khim. Prom. vol. 45, No. 10, 1969, pp. 758-763, English translation (13 pages).*

(Continued)

*Primary Examiner* — Ngoc-Yen Nguyen

(57) ABSTRACT

Disclosed is a process/system for the removal of metal chloride impurities from a titanium tetrachloride stream. The metal chloride impurities are removed through contact of the titanium tetrachloride stream with an alumino-silicate material, which can be selected based on certain properties of the alumino-silicate and based on the geometries of the impurity(ies) and the alumino-silicate.

33 Claims, 1 Drawing Sheet

(56) References Cited

U.S. PATENT DOCUMENTS

| | | | | |
|---|---|---|---|---|
| 6,395,070 | B1* | 5/2002 | Bhadha | B01D 53/02 |
| | | | | 502/78 |
| 7,341,665 | B2 | 3/2008 | Vignola et al. | |
| 2002/0179427 | A1 | 12/2002 | Goddard et al. | |
| 2003/0133861 | A1* | 7/2003 | Bowen | C01B 9/00 |
| | | | | 423/62 |
| 2006/0275195 | A1* | 12/2006 | Gu | C01G 23/022 |
| | | | | 423/492 |
| 2008/0305032 | A1* | 12/2008 | Cronin | B01D 15/00 |
| | | | | 423/492 |
| 2014/0151303 | A1 | 6/2014 | Bagatin et al. | |

OTHER PUBLICATIONS

Kang et al, "Separation of Impurity Vanadium from TiCl4 by Means of Adsorption", Rare Metals, Vo. 18, No. 2, Jun. 1999, pp. 129-132.*

Dvernyakova et al, "Purification of Tianium Tetrachloride from Iron, Chromium, and Vanadium by Sorbing Materials", Institute of General and Inorganic Chemistry, Academy of Sciences of the Ukrainian SSR, pp. 186-188. Translated from Zhurnal Prikladnoi Khimii, vol. 63, No. 1, pp. 203-205, Jan. 1990.*

International Search Report, mailed Jul. 26, 2013 in PCT/US2013/036544, filed Apr. 15, 2013.

Written Opinion of the International Search Report mailed Jul. 26, 2013 in PCT/US2013, filed Apr. 15, 2013.

Hiroshi Watanabe, et al., Method of Decoloring Titanium Tetrachloride, Dec. 27, 1985, pp. 1-7, Published in Japan.

* cited by examiner

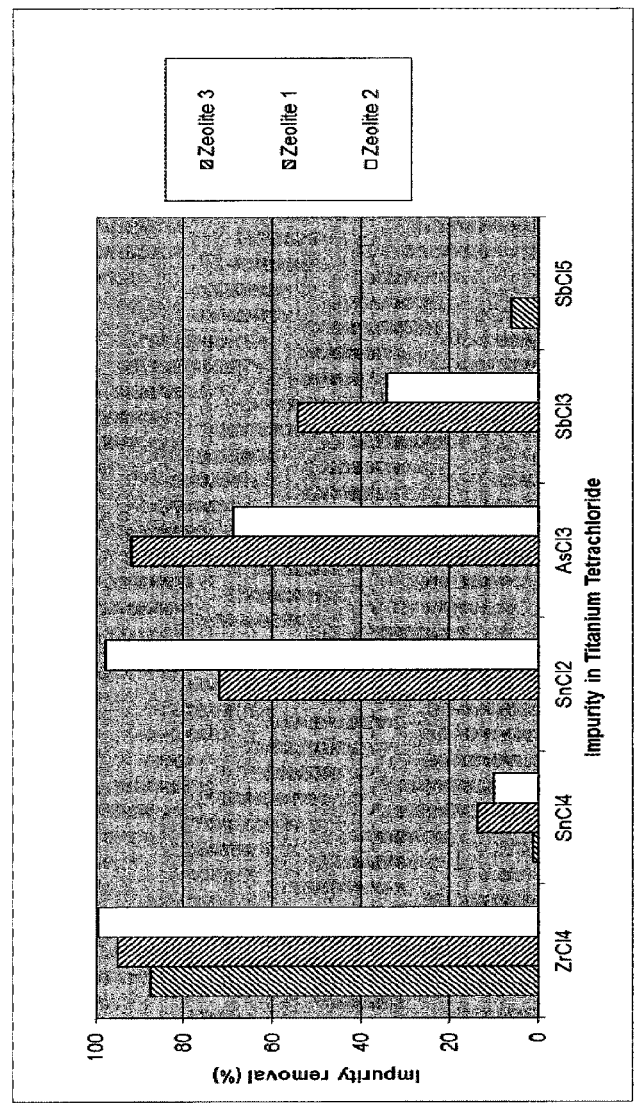

PURIFICATION OF TITANIUM TETRACHLORIDE

CROSS REFERENCE TO RELATED APPLICATIONS/INCORPORATION BY REFERENCE STATEMENT

This application is a national stage application filed under 35 USC §371 of PCT/US2013/036544, filed Apr. 15, 2013; which claims benefit to U.S. Provisional application No. 61/636,156, filed Apr. 20, 2012, each of which is hereby expressly incorporated herein by reference in its entirety.

FIELD OF THE INVENTION

The present invention relates generally to processes and systems for purifying titanium tetrachloride. More specifically, the invention relates to the removal of chloride or oxychloride metal contaminants from titanium tetrachloride using an alumino-silicate adsorbent.

DESCRIPTION OF THE RELATED ART

Titanium tetrachloride ($TiCl_4$) is produced from the chlorination of titaniferous ores. The manufacture of high purity $TiCl_4$ has become more challenging due to the limited supply, and resulting high costs, of high purity titanium ores. While the use of lower cost and more abundant lower grade ores would be preferable, such would require additional steps or unit operations, such as more extensive distillation, to manufacture the same purity of $TiCl_4$. It is generally desirable to keep this purification process simple and of low cost.

There is also a need for purification of lower grade (merchant) $TiCl_4$ produced from lower grade ores to remove corrosive metal chlorides or oxychlorides, such as $SnCl_4$ and $SnCl_2$ (tin chlorides).

The common art teaches the use of high surface area absorbers like activated carbon to remove contaminants, but it has been found that tin chlorides are not removed effectively using activated carbon.

Accordingly, there remains a need for an improved process and system for purifying either high or merchant grade $TiCl_4$ to remove metal chloride and oxychloride contaminants, and which can be tailored for removal of specific contaminants of concern.

SUMMARY OF THE INVENTION

In accordance with an embodiment of the present invention, a titanium tetrachloride purification process is provided comprising the steps of:
 a) contacting a feedstock comprising titanium tetrachloride and at least one impurity with an alumino-silicate material to thereby form a product stream, wherein the at least one impurity comprises a compound selected from the group consisting of carbonyl sulfide, sulfur dioxide, phosgene, hydrogen sulfide, carbon disulfide, and chlorides and oxychlorides of: post transition metals, metalloids, zirconium, hafnium, iron, chromium, copper, carbon, manganese, vanadium, nickel; and combinations thereof; and
 b) withdrawing the product stream. Optionally, the alumino-silicate material, upon becoming spent, can be regenerated for further use in the removal of impurities from the feedstock.

BRIEF DESCRIPTION OF THE DRAWINGS

The FIGURE is a chart showing % impurity removal from $TiCl_4$ for various zeolites and impurities.

DETAILED DESCRIPTION OF THE INVENTION

The titaniferous ores useful in the current invention can be any titaniferous ores capable of being chlorinated to produce sufficient quantities of $TiCl_4$.

A feedstock comprising titanium tetrachloride and at least one impurity can be contacted, preferably in a contacting vessel, with an alumino-silicate material to thereby form a product stream. The at least one impurity can be any impurity commonly present in a titanium tetrachloride stream obtained from the chlorination of a titaniferous ore. More particularly, the at least one impurity comprises a compound selected from the group consisting of carbonyl sulfide, sulfur dioxide, phosgene, hydrogen sulfide, carbon disulfide, and chlorides and oxychlorides of: post transition metals, metalloids, zirconium, hafnium, iron, chromium, copper, carbon, manganese, vanadium, nickel, thorium, uranium, and combinations thereof. The product stream is then withdrawn from the contacting vessel.

The feedstock can be vaporous, or a liquid, or a mixture of the two. In accordance with one embodiment, the titanium tetrachloride is anhydrous when contacted with the alumino-silicate. In accordance with another embodiment, the titanium tetrachloride is in an aqueous solution when contacted with the alumino-silicate.

The post transition metals can be selected from the group consisting of aluminum, gallium, indium, thallium, tin, lead, bismuth, and combinations thereof; and the metalloids can be selected from the group consisting of boron, silicon, germanium, arsenic, antimony, tellurium, polonium, and combinations thereof.

Such impurity(ies) can be present in the feedstock in the range of from about 0.1 to about 10,000 ppmw, or from about 5 to about 1000 ppmw.

The resulting product stream can contain less than about 80 weight %, or less than about 50 weight %, or less than about 20 weight % of the impurity(ies) contained in the feedstock.

More particularly, the at least one impurity can be selected from the group consisting of chlorides and oxychlorides of tin, arsenic, antimony, zirconium and combinations thereof.

The feedstock can comprise in the range of from about 1 to about 500 ppmw, or from about 1 to about 200 ppmw, of combined chlorides and/or oxychlorides of tin. The product stream can contain less than about 20 weight %, or less than about 10 weight %, of the chlorides and/or oxychlorides of tin contained in the feedstock.

The feedstock can comprise in the range of from about 0.1 to about 200 ppmw, or from about 0.1 to about 20 ppmw, of combined chlorides and/or oxychlorides of arsenic. The product stream can contain less than about 20 weight %, or less than about 10 weight %, of the chlorides and/or oxychlorides of arsenic contained in the feedstock.

The feedstock can comprise in the range of from about 0.1 to about 200 ppmw, or from about 0.1 to about 20 ppmw, of combined chlorides and/or oxychlorides of antimony. The product stream can contain less than about 20 weight %, or less than about 10 weight %, of the chlorides and/or oxychlorides of antimony contained in the feedstock.

The feedstock can comprise in the range of from about 0.1 to about 100 ppmw, or from about 0.1 to about 10 ppmw, of combined chlorides and/or oxychlorides of zirconium. The product stream can contain less than about 20 weight %, or less than about 10 weight %, of the chlorides and/or oxychlorides of zirconium contained in the feedstock.

The alumino-silicate useful in the present invention can have a surface area greater than about 200 m$^2$/g, or greater than about 600 m$^2$/g. Also, the alumino-silicate can have an average channel size in the range of from about 4.5 to about 9.5 Å, or in the range of from about 6.5 to about 7.5 Å; and can have an alkali content in the range of from about 0.02 to about 0.2 wt %, or in the range of from about 0.025 to about 0.04.

Further, the silica to alumina ratio of the alumino-silicate can be in the range of from about 30 to about 100, or from about 60 to about 85. More particularly, the alumino-silicate is a zeolite material, preferably a faujasite zeolite.

The feedstock can be contacted with the alumino-silicate in a single vessel, and, upon becoming spent, the spent alumino-silicate can then be removed from such vessel for disposal. Also, once the alumino-silicate becomes spent, contact of the feedstock with the spent alumino-silicate can be stopped while the spent alumino-silicate is regenerated forming a regenerated alumino-silicate which is then contacted with feedstock. This cycle can then be repeated. The regeneration can be accomplished by contacting the spent alumino-silicate with a flow of either inert gas or TiCl$_4$, or mixtures thereof, at elevated temperatures.

The feedstock can also be contacted with the alumino-silicate in a system containing multiple vessels (at least two). In such a system, the feedstock can be charged sequentially to the vessels with regeneration of the alumino-silicate in each of the vessels upon becoming spent.

The feedstock can be obtained from the chlorination of a titanium ore of relatively low grade, such as, but not limited to, a titanium ore comprising titanium oxide, iron oxide, and at least 3 wt %, or at least 4 wt %, of the at least one impurity.

The product stream can be used to make pigment grade titanium compound (TiO$_2$), or to make metal grade titanium compound, or to make electronic grade titanium metal compound.

The alumino-silicate material can be selected for the removal of a specific one of the impurities or specific groups of the impurities based on: i) the geometric size of the impurity or impurities, ii) the channel size of the alumino-silicate material, and iii) at least one property of the alumino-silicate material selected from the group consisting of polarity, surface area, alkali content, silica to alumina ratio, and combinations thereof. For example, Table 1 lists approximate molecular diameters for various impurities, for titanium tetrachloride, and the approximate average channel size for a faujasite zeolite (FAU).

TABLE 1

| ZrCl$_4$~6.8 Å | AsCl$_3$~6.4 Å |
| SnCl$_2$~6.6 Å | TiCl$_4$~6.4 Å |
| SnCl$_4$~6.8 Å | FAU~7.4 Å |

EXAMPLES

Quantities of titanium tetrachloride were each separately doped with an impurity. The doped samples were then each separately contacted with a faujasite-type zeolite obtained from Zeolyst International, described as follows:
Zeolite 1—Product designation CP 811C-300
Zeolite 2—Product designation CP 814C
Zeolite 3—Product designation CBV-901

The samples were contacted with the zeolites in the form of anhydrous liquids. The initial and final concentrations of the impurities were measured, and the results of such testing are shown in Table 2.

TABLE 2

| Impurity | Faujasite Zeolite | Initial Impurity Conc., ppmw | Final Impurity Conc., ppmw | % Change |
|---|---|---|---|---|
| ZrCl$_4$ | 1 | 70.36 | 3.47 | 95.0 |
| ZrCl$_4$ | 2 | 70.36 | 0.296 | 99.6 |
| ZrCl$_4$ | 3 | 3.3 | 0.41 | 87.7 |
| SnCl$_2$ | 1 | 93 | 26 | 72.0 |
| SnCl$_2$ | 2 | 93 | 2 | 97.9 |
| SnCl$_4$ | 1 | 139 | 120 | 13.7 |
| SnCl$_4$ | 2 | 139 | 125 | 10.1 |
| AsCl$_3$ | 1 | 19.0 | 1.44 | 92 |
| AsCl$_3$ | 2 | 19.0 | 5.92 | 68.8 |
| AsCl$_3$ | 3 | 5.53 | 5.64 | 0 |
| SbCl$_3$ | 1 | 157.0 | 95.0 | 39.5 |
| SbCl$_3$ | 2 | 157.0 | 109.0 | 30.6 |
| SbCl$_5$ | 3 | 25.0 | 23.5 | 6.1 |

As can be seen from the results presented in Table 2, contacting metal chloride contaminated titanium tetrachloride with adsorbers in accordance with the present inventive method results in a significant decrease in the concentrations of such impurities. Also, as is more clearly shown in the FIGURE, the plot of removal efficiency of the zeolite choices across the different impurities reveals a wide variability, and the opportunity to tailor a system/process utilizing a specific zeolite, or mix of zeolites, to accomplish a targeted removal efficiency for specific impurities.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

Further, unless expressly stated otherwise, the term "about" as used herein is intended to include and take into account variations due to manufacturing tolerances and/or variabilities in process control.

Changes may be made in the construction and the operation of the various components, elements and assemblies described herein, and changes may be made in the steps or sequence of steps of the methods described herein without departing from the spirit and the scope of the invention as defined in the following claims.

What is claimed is:
1. A titanium tetrachloride purification process comprising the steps of:
   a) contacting an adsorbent with a feedstock comprising titanium tetrachloride and at least one impurity, wherein at least a portion of the at least one impurity is adsorbed on the adsorbent to thereby form a product stream having a reduced amount of the at least one impurity, wherein said at least one impurity comprises a compound selected from the group consisting of carbonyl sulfide, sulfur dioxide, phosgene, hydrogen sulfide, carbon disulfide, and chlorides and oxychlorides of: post transition metals, metalloids, zirconium, hafnium, iron, chromium, copper, carbon, manganese, vanadium, nickel, thorium, uranium; and combinations thereof, and wherein the adsorbent comprises a faujasite zeolite having an average channel size in the range of from about 6.5 Å to about 7.5 Å and selected for the removal of the at least one impurity based on: i) the geometric size of the at least one impurity, and ii) the channel size of the faujasite zeolite; and b) withdrawing said product stream from said adsorbent having said at least one impurity adsorbed thereon.

2. The process of claim 1 wherein said feedstock is vaporous.

3. The process of claim 1 wherein said feedstock is a liquid.

4. The process of claim 1 wherein said titanium tetrachloride is anhydrous.

5. The process of claim 1 wherein said titanium tetrachloride is in an aqueous solution.

6. The process of claim 1 wherein said post transition metals are selected from the group consisting of aluminum, gallium, indium, thallium, tin, lead, bismuth, and combinations thereof.

7. The process of claim 1 wherein said metalloids are selected from the group consisting of boron, silicon, germanium, arsenic, antimony, tellurium, polonium, and combinations thereof.

8. The process of claim 1 wherein said at least one impurity is present in said feedstock in the range of from about 0.1 to about 10,000 ppmw.

9. The process of claim 1 wherein said product stream contains less than about 50 weight % of said at least one impurity contained in said feedstock.

10. The process of claim 1 wherein said at least one impurity is selected from the group consisting of chlorides and oxychlorides of tin, arsenic, antimony, zirconium and combinations thereof.

11. The process of claim 1 wherein said at least one impurity is selected from the group consisting of chlorides and oxychlorides of tin, and combinations thereof.

12. The process of claim 11 wherein said feedstock comprises in the range of from about 1 to about 500 ppmw of combined chlorides and/or oxychlorides of tin.

13. The process of claim 12 wherein said product stream contains less than about 20 weight % of the chlorides and/or oxychlorides of tin contained in said feedstock.

14. The process of claim 1 wherein said at least one impurity is selected from the group consisting of chlorides and oxychlorides of arsenic, and combinations thereof.

15. The process of claim 14 wherein said feedstock comprises in the range of from about 0.1 to about 200 ppmw of combined chlorides and/or oxychlorides of arsenic.

16. The process of claim 15 wherein said product stream contains less than about 20 weight % of the chlorides and/or oxychlorides of arsenic contained in said feedstock.

17. The process of claim 1 wherein said at least one impurity is selected from the group consisting of chlorides and oxychlorides of antimony, and combinations thereof.

18. The process of claim 17 wherein said feedstock comprises in the range of from about 0.1 to about 200 ppmw of combined chlorides and/or oxychlorides of antimony.

19. The process of claim 18 wherein said product stream contains less than about 20 weight % of the chlorides and/or oxychlorides of antimony contained in said feedstock.

20. The process of claim 1 wherein said at least one impurity is selected from the group consisting of chlorides and oxychlorides of zirconium, and combinations thereof.

21. The process of claim 20 wherein said feedstock comprises in the range of from about 0.1 to about 100 ppmw of combined chlorides and/or oxychlorides of zirconium.

22. The process of claim 21 wherein said product stream contains less than about 20 weight % of the chlorides and/or oxychlorides of zirconium contained in said feedstock.

23. The process of claim 1 wherein said adsorbent comprises a faujasite zeolite having a surface area greater than about 200 $m^2/g$.

24. The process of claim 23 wherein said faujasite zeolite has a surface area greater than about 600 $m^2/g$.

25. The process of claim 23 wherein said faujasite zeolite has an alkali content in the range of from about 0.02 to about 0.2 wt %.

26. The process of claim 25 wherein said faujasite zeolite has an alkali content in the range of from about 0.025 to about 0.04.

27. The process of claim 23 wherein said faujasite zeolite has a silica to alumina ratio in the range of from about 30 to about 100.

28. The process of claim 27 wherein said faujasite zeolite has a silica to alumina ratio in the range of from about 60 to about 85.

29. The process of claim 1 wherein said feedstock is contacted with said faujasite zeolite in a single vessel, and wherein said faujasite zeolite is removed from said vessel and disposed once spent.

30. The process of claim 1 wherein said feedstock is contacted with said faujasite zeolite in a single vessel until said faujasite zeolite becomes spent forming a spent faujacite zeolite, whereupon the contacting of said feedstock in step a) is stopped while said spent faujacite zeolite is regenerated forming a regenerated faujacite zeolite which is then contacted with said feedstock.

31. The process of claim 1 wherein said feedstock is contacted with said faujasite zeolite in a system containing multiple vessels, and wherein said feedstock is charged sequentially to said vessels with regeneration of said faujasite zeolite in each of said vessels upon becoming spent.

32. The process of claim 1 wherein said feedstock is obtained from the chlorination of titanium ore comprising titanium oxide, iron oxide, and at least 3 wt % of said at least one impurity.

33. The process of claim 1 wherein said faujasite zeolite is selected for the removal of a specific one of said impurities or specific groups of said impurities based on: i) the geometric size of said impurity or impurities, ii) the channel size of said faujasite zeolite, and iii) at least one property of said faujasite zeolite selected from the group consisting of polarity, surface area, alkali content, silica to alumina ratio, and combinations thereof.

* * * * *